United States Patent
Eckel et al.

(10) Patent No.: US 8,331,539 B2
(45) Date of Patent: Dec. 11, 2012

(54) METHOD AND SYSTEM FOR REPRESENTING THE ATTRIBUTES OF AN INCOMING CALL

(75) Inventors: Charles Eckel, Santa Clara, CA (US); Alison Paige Andrews, Oakland, CA (US); Najeeb Haddad, Sunnyvale, CA (US)

(73) Assignee: Cisco Technology, Inc., San Jose, CA (US)

( * ) Notice: Subject to any disclaimer, the term of this patent is extended or adjusted under 35 U.S.C. 154(b) by 1401 days.

(21) Appl. No.: 11/249,952

(22) Filed: Oct. 13, 2005

(65) Prior Publication Data

US 2007/0116220 A1 May 24, 2007

(51) Int. Cl.
*H04M 1/64* (2006.01)

(52) U.S. Cl. ................................... 379/67.1; 379/88.12

(58) Field of Classification Search ............ 379/142.04, 379/67, 201; 455/414.1
See application file for complete search history.

(56) References Cited

U.S. PATENT DOCUMENTS

| | | | |
|---|---|---|---|
| 6,411,696 B1 * | 6/2002 | Iverson et al. | 379/201.06 |
| 7,184,527 B1 * | 2/2007 | Lin et al. | 379/93.17 |
| 2002/0193125 A1 * | 12/2002 | Smith | 455/458 |
| 2006/0045252 A1 * | 3/2006 | Gorti et al. | 379/201.02 |

OTHER PUBLICATIONS

Meredith Ringel and Julia Hirschberg, "Automated Message Prioritization: Making Voicemail Retrieval More Efficient", Apr. 20-25, 2002, 2 pages, Minneapolis, Minnesota, USA.
Zeynep Inanoglu and Ron Caneel, "Emotive Alert: HMM-Based Emotion Detection In Voicemail Messages", Jan. 9-12, 2005, 3 pages, San Diego, CA, USA.
Petter Alexanderson, "Peripheral Awareness and Smooth Notification: the Use of Natural Sounds in Process Control Work", Oct. 23-27, 2004, 4 pages, Tampere, Finland.
William Buxton, "Communicating with Sound", Apr. 1985, 5 pages.

* cited by examiner

*Primary Examiner* — Curtis Kuntz
*Assistant Examiner* — Amal Zenati
(74) *Attorney, Agent, or Firm* — Fish & Richardson P.C.

(57) ABSTRACT

A method and a system for representing the attributes of an incoming call are disclosed. A determination module is used to determine certain attributes of an incoming call. The attributes can be the caller ID, urgency of call or call location, among others. The determined attributes are then converted into an audio-tone that is representative of the incoming call. Characteristics, such as pitch, volume and cadence of the audio-tone are chosen to represent the attributes of the incoming call.

10 Claims, 5 Drawing Sheets

| Attribute | Data Point | Audio-tone |
|---|---|---|
| Urgency | Number of calls in the past specified time | Treble Pitch |
| Special Request | Call from hospital / police / government agency | Treble Pitch + Tone Rise |
| Not Urgent | Not recently called | Bass Pitch |
| Replying back | Recently called the caller | Tones rise incrementally |
| Intimacy | Call via speed dial | Tones drop then rise in a closed loop |
| Telemarketer | Blocked number | Tones drop incrementally |

| Attribute | Data Point | Audio-tone |
|---|---|---|
| Urgency | Number of calls in the past specified time | Treble Pitch |
| Special Request | Call from hospital / police / government agency | Treble Pitch + Tone Rise |
| Not Urgent | Not recently called | Bass Pitch |
| Replying back | Recently called the caller | Tones rise incrementally |
| Intimacy | Call via speed dial | Tones drop then rise in a closed loop |
| Telemarketer | Blocked number | Tones drop incrementally |

FIG.5

METHOD AND SYSTEM FOR REPRESENTING THE ATTRIBUTES OF AN INCOMING CALL

BACKGROUND OF THE INVENTION

1. Field of Invention

Embodiments of the invention relate to telecommunication systems in general. More specifically, the embodiments of the invention relate to methods and systems for representing the attributes of an incoming call.

2. Description of the Background Art

Communication devices, such as phones generate audio-signals during an incoming call to notify the user. The audio signals are also known as ring tones.

In conventional phones, the audio signals are the same, regardless of the characteristics of an incoming call. Most of the phones offer the option of manually setting custom audio signals. Accordingly, an audio signal can be customized for a particular caller or group of callers. However, in this case, the customized audio signal offers information pertaining only to a particular caller or group of caller(s). Some phones offer the facility of announcing the caller's identity by using an audio signal. Instant messages and e-mail pop-ups also generate audio signals to notify the user of a message or e-mail, respectively.

However, none of the conventional techniques reflect the characteristics of an incoming message or call in the generated audio signal.

BRIEF DESCRIPTION OF THE DRAWINGS

FIG. 5 illustrates a table representing the audio-tones for certain attributes of the incoming call, in accordance with one embodiment of the invention.

DETAILED DESCRIPTION OF EMBODIMENTS OF THE INVENTION

Various embodiments of the invention provide a method and a system for representing the attributes of an incoming call in communication devices, such as phones. The attributes of the incoming call can be represented by an audio-tone. The audio-tone can be derived from the identified attributes of the incoming call. The method includes the use of psychoacoustics to generate the audio-tone based on the attributes of the incoming call. Psychoacoustics is the study of subjective human perception of sounds. The generated audio-tone enables the callee to subconsciously absorb information regarding the call.

Figure 1:
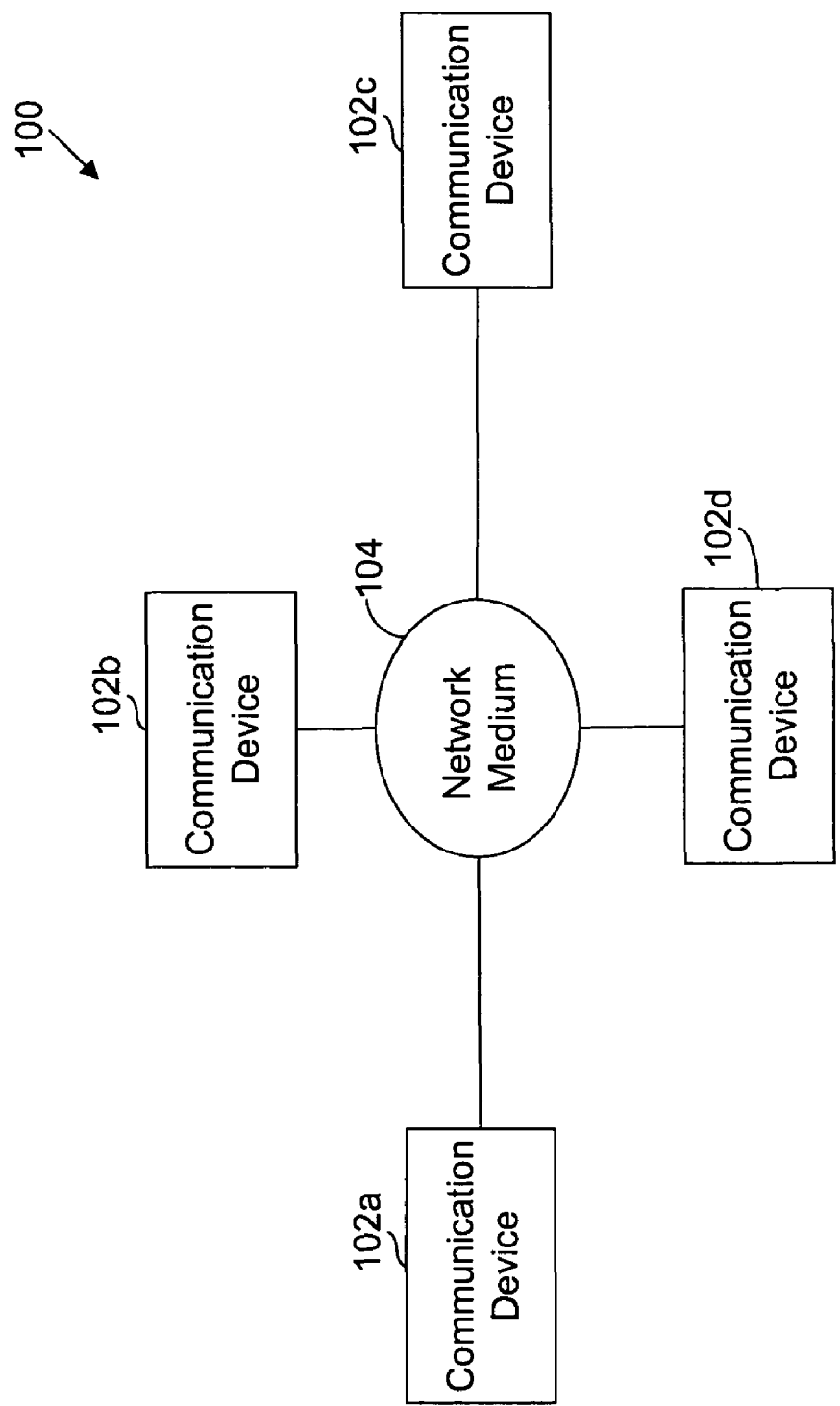
FIG. 1 illustrates a telecommunications network environment including communication devices, in accordance with an exemplary embodiment of the invention.

Referring now to FIG. 1, there is a telecommunications network environment 100 for implementing an exemplary embodiment of the invention. Environment 100 includes communication devices 102a, 102b, 102c, and 102d, which are connected to each other via a network medium 104. Communication devices 102a, 102b, 102c, and 102d may be fixed line telephones, cellular phones, Personal Digital Assistants (PDAs), cordless phones, or any other wired or wireless devices that are capable of voice communication. Network medium 104 may be a wired or a wireless medium for transferring voice communication signals. According to an embodiment of the invention, a caller at a communication device 102a can initiate a call to communicate with a communication device 102b. Communication device 102b receives the incoming call, and a callee is notified by an audio-tone. According to various embodiments of the invention, the callee is the user at communications device 102b.

Figure 2:
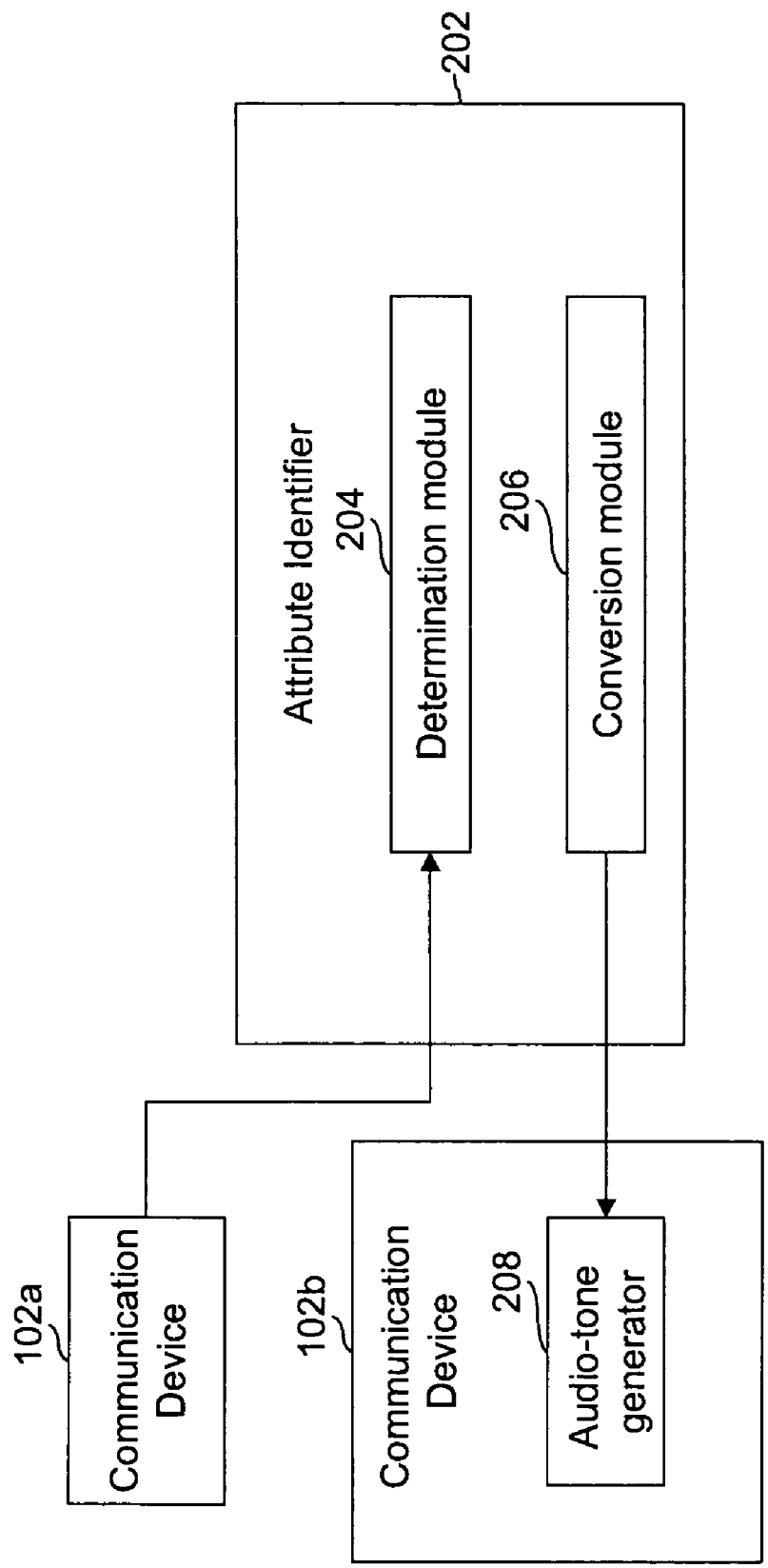
FIG. 2 illustrates a block diagram depicting a system for converting call attributes into audio-tones in a communication device, in accordance with an exemplary embodiment of the invention.

Referring now to FIG. 2, there is a block diagram depicting a system for converting call attributes into audio-tones, in accordance with an exemplary embodiment of the invention. The system includes an attribute identifier 202. Further, attribute identifier 202 includes a determination module 204 and a conversion module 206. In an embodiment of the invention, conversion module 206 receives a call from communication device 102a. Conversion module 206 sends instructions for generating an audio-tone to communication device 102b. In an embodiment, the instructions are received by an audio-tone generator 208, which is included in communication device 102b.

In an embodiment of the invention, determination module 204 determines the attributes of an incoming call. The attributes may be one or more of the following: caller identity (ID), urgency of call, call location, capabilities of the caller, capabilities of the callee, calling history of the caller, and the caller's time zone. In various embodiments, determination module 204 may also determine the number of times the caller has called the callee, the average duration of the calls between the caller and the callee or the last time the caller called the callee. In other embodiments, determination module 204 may determine whether the caller is in the callee's address book, whether the caller has been blocked by the callee or whether any special call routing rules by the caller apply to the callee. Determining the capabilities of the caller include determining whether the caller has video, audio, instant messaging or SMS capabilities. The call location may be determined by using Global Positioning System (GPS). The call location may also be determined if the call is from a well-known institution, such as a hospital or a police station. For example, police stations have a standard telephone number, which can be identified by determination module 204. The attributes determined by determination module 204 can be converted into representative audio-tones by conversion module 206. In an embodiment of the invention, conversion module 206 chooses the characteristics of the audio-tone according to its determined attributes. The characteristics of the audio-tone can include volume, pitch and cadence. Conversion module 206 may also raise and/or drop one or more of the characteristics of the audio-tone. After choosing the characteristics of the audio-tone, conversion module 206 sends instructions to audio-tone generator 208 to generate an audio-tone.

In case of wireline phones, conversion module 206 may directly instruct audio-tone generator 208 to generate the representative audio-tone. In case of wireless phones, conversion module 206 may signal a special message to audio-tone generator 208. The special message sent by conversion module 206 may be in the form of tags associated with the incoming call, or independent messages. According to the instructions given by conversion module 206, audio-tone generator 208 generates the audio-tone. In an embodiment, attribute identifier 202 may be a part of communication device 102b. In different embodiments of the invention, determination module 204 may be a part of network 100 or communication device 102*b*. In different embodiments of the invention, conversion module 206 may be a part of network 100 or communication device 102*b*.

Figure 3:
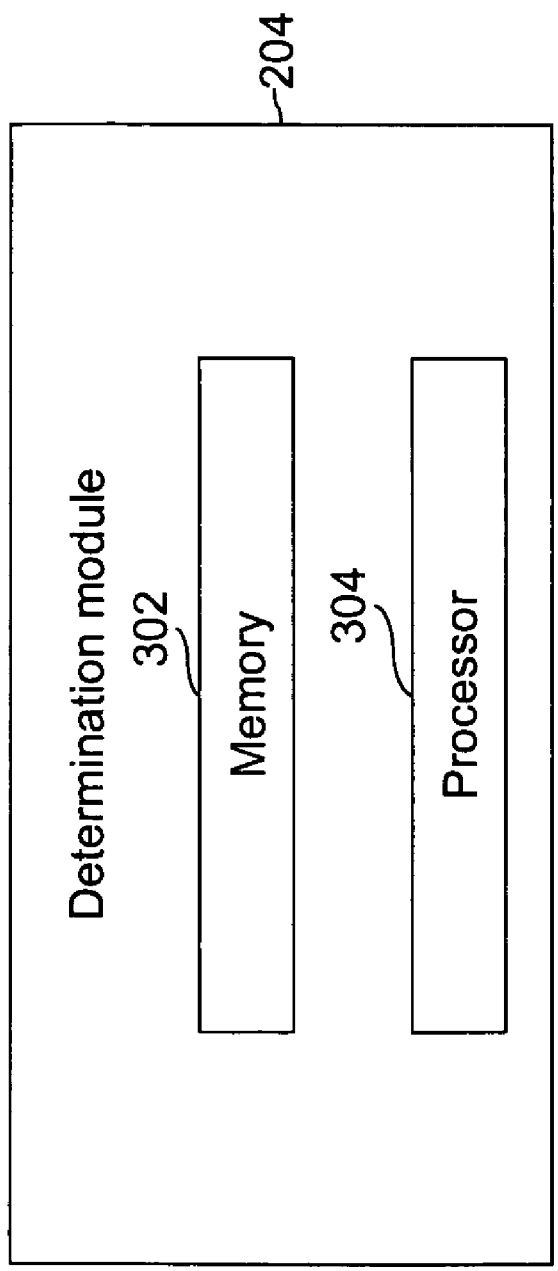
FIG. 3 illustrates a block diagram depicting the determination module, in accordance with an exemplary embodiment of the invention.

Referring now to FIG. 3, there is a block diagram depicting determination module 206, in accordance with an exemplary embodiment of the invention. Determination module 206 includes a memory 302 and a processor 304. Memory 302 can be a storage device that stores the call history. Processor 304 can be a processing device that determines the call attributes. In one embodiment, processor 304 attaches a tag to the call, and transfers the call to conversion module 206. In another embodiment, processor 304 sends instructions regarding the determined call attributes to conversion module 206. Conversion module 206 then instructs audio-tone generator 208 to generate the representative audio-tone.

Figure 4:
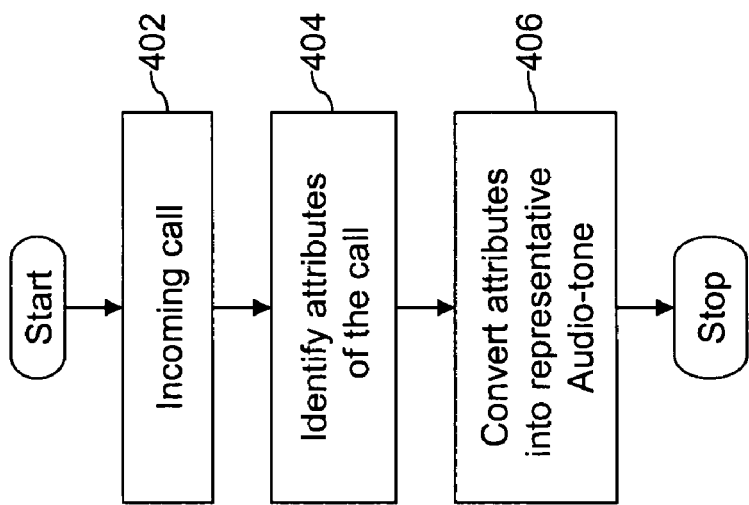
FIG. 4 illustrates a flowchart of a method for converting call attributes into audio-tones in a communication device, in accordance with an exemplary embodiment of the invention.

Referring now to FIG. 4, there is a flowchart of a method for converting call attributes into audio-tones, in accordance with an exemplary embodiment of the invention. At step 402, an incoming call is detected. The detection can be performed by communication device 102*b* with the help of a call notification. The call notification can be an electrical signal, a wave signal or an optical signal. At step 404, determination module 204 determines the attributes of the call. Further, at step 406, conversion module 206 converts the attributes determined by determination module 204 into a representative audio-tone. Conversion module 206 then instructs audio-tone generator 208 to generate the representative audio-tone.

Referring now to FIG. 5, there is a table representing the audio-tones for certain attributes of the incoming call, in accordance with one embodiment of the invention. For example, the urgency of the incoming call can be determined on the basis of the number of calls by the caller within a specified time. In an embodiment of the invention, the urgency is represented by a treble pitch audio-tone. According to the concepts of psychoacoustics, treble pitch denotes 'alarm'. Hence, the callee subconsciously knows that the incoming call is an urgent call. Similarly, according to a concept of psychoacoustics, tones dropping and rising in a closed loop denote 'intimacy'. Therefore, for calls from close acquaintances, a dropping and rising audio-tone can be used. The characteristics of the audio-tone generate an emotional response in the callee. Hence, the callee can subconsciously gather information regarding the incoming call.

Embodiments of the invention have the advantage that the users do not have to manually adjust the tones. Further, the callee can subconsciously identify certain attributes of the call. This helps in reducing the effort required in deciding whether to answer a call or not. Although the invention has been discussed with respect to specific embodiments thereof, these embodiments are merely illustrative, and not restrictive, of the invention. For example, a 'method and system for representing the attributes of an incoming call' can include any type of analysis, manual or automatic, to anticipate the needs of the method. Thus, while embodiments of the invention describe tones as representing one or more attributes of an incoming call, it is to be understood that the spirit and scope of the present invention includes any and/or additional indicator(s) (e.g., visuals, etc) for representing one or more attributes of an incoming call. Therefore, a visual indicator may be associated with the same data points that currently tag to sounds. A communication device receiving an incoming call would have a screen for displaying the visual. By way of example only, psycho-visualization examples may include: "red=urgent", "green=in contact book", "animated=call back." Thus, embodiments of the present invention include a device and method for representing one or more attributes of an incoming call. One or more attributes of the incoming call is/are determined. The one or more attributes of the incoming call is/are then converted into an audio-tone and/or a visual indicator, each and/or all of which represent the one or more attributes of the incoming call.

Although specific protocols have been used to describe embodiments, other embodiments can use other transmission protocols or standards. Use of the terms 'peer', 'client', and 'server' can include any type of device, operation, or any other process. The present invention can operate between any two processes or entities including users, devices, functional systems, or combinations of hardware and software. Peer-to-peer networks and any other networks or systems where the roles of client and server are switched, change dynamically, or are not even present, are within the scope of the invention.

Any suitable programming language can be used to implement the routines of the present invention including C, C++, Java, assembly language, etc. Different programming techniques, such as procedural or object-oriented can be employed. The routines can execute on a single processing device or multiple processors. Although the steps, operations, or computations may be presented in a specific order, this order may be changed in different embodiments. In some embodiments, multiple steps shown sequentially in this specification can be performed at the same time. The sequence of operations described herein can be interrupted, suspended, or otherwise controlled by another process, such as an operating system, kernel, etc. The routines can operate in an operating system environment or as stand-alone routines occupying all, or a substantial part, of the system processing.

In the description herein for embodiments of the present invention, numerous specific details are provided, such as examples of components and/or methods, to provide a thorough understanding of embodiments of the present invention. One skilled in the relevant art will recognize, however, that an embodiment of the invention can be practiced without one or more of the specific details, or with other apparatus, systems, assemblies, methods, components, materials, parts, and/or the like. In other instances, well-known structures, materials, or operations are not specifically shown or described in detail to avoid obscuring aspects of embodiments of the present invention.

In the description herein for embodiments of the present invention, a portion of the disclosure recited in the specification may contain material which is subject to copyright protection. Computer program source code, object code, instructions, text or other functional information that is executable by a machine may be included in an appendix, tables, figures or in other forms. The copyright owner has no objection to the facsimile reproduction of the specification as filed in the Patent and Trademark Office. Otherwise, all copyright rights are reserved.

A 'processor' or 'process' includes any hardware and/or software system, mechanism or component that processes data, signals or other information. A processor can include a system with a general-purpose central processing unit, multiple processing units, dedicated circuitry for achieving functionality, or other systems. Processing need not be limited to a geographic location, or have temporal limitations. For example, a processor can perform its functions in 'real time', 'offline', in a 'batch mode', etc. Portions of processing can be performed at different times and at different locations, by different (or the same) processing systems.

A 'computer' for purposes of embodiments of the present invention may include any processor-containing device, such as a mainframe computer, personal computer, laptop, notebook, microcomputer, server, personal data manager or 'PIM' (also referred to as a personal information manager), smart cellular or other phone, so-called smart card, set-top box, or any of the like. A 'computer program' may include any locally or remotely executable suitable program or sequence of coded instructions, which are to be inserted into a computer, well known to those skilled in the art. Stated more specifically, a computer program includes an organized list of instructions that, when executed, causes the computer to behave in a predetermined manner. A computer program contains a list of ingredients (called variables) and a list of directions (called statements) that tell the computer what to do with the variables. The variables may represent numeric data, text, audio or graphical images. If a computer is employed for presenting media via a suitable directly or indirectly coupled input/output (I/O) device, the computer would have suitable instructions for allowing a user to input or output (e.g., present) program code and/or data information, respectively in accordance with the embodiments of the present invention.

A 'computer-readable medium' for purposes of embodiments of the present invention may be any medium that can contain and store the computer program for use by or in connection with the instruction execution system apparatus, system or device. The computer-readable medium can be, by way of example only but not by limitation, a semiconductor system, apparatus, system, device, or computer memory.

Reference throughout this specification to 'one embodiment', 'an embodiment', or 'a specific embodiment' means that a particular feature, structure, or characteristic described in connection with the embodiment is included in at least one embodiment of the present invention and not necessarily in all embodiments. Therefore, respective appearances of the phrases 'in one embodiment', 'in an embodiment', or 'in a specific embodiment' in various places throughout this specification are not necessarily referring to the same embodiment. Furthermore, the particular features, structures, or characteristics of any specific embodiment of the present invention may be combined in any suitable manner with one or more other embodiments. It is to be understood that other variations and modifications of the embodiments of the present invention described and illustrated herein are possible in light of the teachings herein and are to be considered as part of the spirit and scope of the present invention.

Further, at least some of the components of an embodiment of the invention may be implemented by using a programmed general-purpose digital computer, by using application-specific integrated circuits, programmable logic devices, or field programmable gate arrays, or by using a network of interconnected components and circuits. Connections may be wired, wireless, by modem, and the like.

It will also be appreciated that one or more of the elements depicted in the drawings/figures can also be implemented in a more separated or integrated manner, or even removed or rendered as inoperable in certain cases, as is useful in accordance with a particular application.

Additionally, any signal arrows in the drawings/Figures should be considered only as exemplary, and not limiting, unless otherwise specifically noted. Combinations of components or steps will also be considered as being noted, where terminology is foreseen as rendering the ability to separate or combine is unclear.

As used in the description herein and throughout the claims that follow, 'a', 'an', and 'the' include plural references unless the context clearly dictates otherwise. Also, as used in the description herein and throughout the claims that follow, the meaning of "in" includes "in" and "on" unless the context clearly dictates otherwise.

The foregoing description of illustrated embodiments of the present invention, including what is described in the abstract, is not intended to be exhaustive or to limit the invention to the precise forms disclosed herein. While specific embodiments of, and examples for, the invention are described herein for illustrative purposes only, various equivalent modifications are possible within the spirit and scope of the present invention, as those skilled in the relevant art will recognize and appreciate. As indicated, these modifications may be made to the present invention in light of the foregoing description of illustrated embodiments of the present invention and are to be included within the spirit and scope of the present invention.

Therefore, while the present invention has been described herein with reference to particular embodiments thereof, a latitude of modification, various changes and substitutions are intended in the foregoing disclosures, and it will be appreciated that in some instances some features of embodiments of the invention will be employed without a corresponding use of other features without departing from the scope and spirit of the invention as set forth. Therefore, many modifications may be made to adapt a particular situation or material to the essential scope and spirit of the present invention. It is intended that the invention not be limited to the particular terms used in following claims and/or to the particular embodiment disclosed as the best mode contemplated for carrying out this invention, but that the invention will include any and all embodiments and equivalents falling within the scope of the appended claims.

What is claimed is:

1. A method comprising:

receiving, at a network device, an incoming call from a caller;

determining, by the receiving network device and based on information stored in memory and information included in the incoming call, one or more data points associated with the incoming call that include a geographical location of the caller;

determining, by the network device and based on the one or more data points, values for one or more attributes of the incoming call, where the one or more attributes include a call location and a special request;

automatically choosing, by the network device and based on determining the values for the one or more attributes of the incoming call, one or more characteristics of an audio-tone;

modifying, by the network device and based on the values of the one or more attributes of the incoming call, the chosen characteristics of the audio-tone such that the modified characteristics represent the one or more attributes of the incoming call; and instructing, by the network device, an audio-tone generator to generate at a callee's device the audio-tone with the modified characteristics, such that the audio-tone indicates to the callee the one or more attributes of the incoming call, including the call location and an indication of whether the call represents a special request.

2. The method of claim 1, wherein the one or more attributes of the incoming call comprise a location of the caller.

3. The method of claim 1, wherein the one or more attributes of the incoming call comprise at least one of facilities available in a caller device, a calling pattern of the caller, and a caller time zone.

4. A system comprising:

means for receiving, at a network device, an incoming call from a caller;

means for determining, by the receiving network device and based on information stored in memory and information included in the incoming call, one or more data points associated with the incoming call that include a geographical location of the caller;

means for determining, by the network device and based on the one or more data points, values for one or more attributes of the incoming call, where the one or more attributes include a call location and a special request;

means for automatically choosing, by the network device and based on determining the values for the one or more attributes of the incoming call, one or more characteristics of an audio-tone;

means for modifying, by the network device and based on the values of the one or more attributes of the incoming call, the chosen characteristics of the audio-tone such that the modified characteristics represent the one or more attributes of the incoming call; and means for instructing, by the network device, an audio-tone generator to generate at a callee's device the audio-tone with the modified characteristics, such that the audio-tone indicates to the callee the one or more attributes of the incoming call, including the call location and whether the call is a special request.

5. A system comprising:

a processor;

a determination module including instructions embedded in a non-transitory medium for execution by the processor and configured to cause the processor to perform operations comprising:

determining, based on information stored in memory and information included in an incoming call, one or more data points associated with an incoming call that include a geographical location of the caller; and determining, based on the one or more data points, values for one or more attributes of the incoming call, where the one or more attributes include a call location and a special request; and a conversion module including instructions embedded in the non-transitory medium for execution by the processor and configured to cause the processor to perform operations comprising:

automatically choosing, based on receiving the values for the one or more attributes of the incoming call from the determination module, one or more characteristics of an audio-tone;

modifying, based on the values of the one or more attributes of the incoming call, the chosen characteristics of the audio-tone such that the modified characteristics represent the one or more attributes of the incoming call; and instructing an audio-tone generator to generate at the callee's device the audio-tone with the modified characteristics, such that the audio-tone indicates to the callee the one or more attributes of the incoming call, including the call location and whether the call is a special request.

6. The system of claim 5, wherein the determination module further comprises:

a memory for storing call history; and wherein the instructions are configured to cause the processor to perform operations for determining the one or more attributes by communicating with the memory.

7. The system of claim 5, wherein the one or more attributes of the incoming call comprise at least one of a caller identity, and a location of the caller.

8. The system of claim 5, wherein the one or more attributes of the incoming call comprise at least one of facilities available in a caller device, a calling pattern of the caller, and a caller time zone.

9. A non-transitory machine-readable medium including instructions executable by a processor, the instructions configured to cause the processor to perform operations comprising:

receiving, at a network device, an incoming call from a caller;

determining, by the receiving network device and based on information stored in memory and information included in the incoming call, one or more data points associated with the incoming call that include a geographical location of the caller;

determining, by the network device and based on the one or more data points, values for one or more attributes of the incoming call, where the one or more attributes include a call location and a special request;

automatically choosing, by the network device and based on determining the values for the one or more attributes of the incoming call, one or more characteristics of an audio-tone;

modifying, by the network device and based on the values of the one or more attributes of the incoming call, the chosen characteristics of the audio-tone such that the modified characteristics represent the one or more attributes of the incoming call; and instructing, by the network device, an audio-tone generator to generate at a callee's device the audio-tone with the modified characteristics, such that the audio-tone indicates to the callee the one or more attributes of the incoming call, including the call location and whether the call is a special request.

10. An apparatus comprising:

a processor for executing instructions; and a non-transitory machine readable medium including instructions executable by the processor and configured to cause the processor to perform operations comprising:

receiving, at a network device, an incoming call from a caller;

determining, by the receiving network device and based on information stored in memory and information included in the incoming call, one or more data points associated with the incoming call that include a geographical location of the caller;

determining, by the network device and based on the one or more data points, values for one or more attributes of the incoming call, where the one or more attributes include a call location and a special request;

automatically choosing, by the network device and based on determining the values for the one or more attributes of the incoming call, one or more characteristics of an audio-tone;

modifying, by the network device and based on the values of the one or more attributes of the incoming call, the chosen characteristics of the audio-tone such that the modified characteristics represent the one or more attributes of the incoming call; and instructing, by the network device, an audio-tone generator to generate at the callee's device the audio-tone with the modified characteristics, such that the audio-tone indicates to the callee the one or more attributes of the incoming call, including the call location and whether the call is a special request.

* * * * *